United States Patent [19]

Dolenc et al.

[11] 3,969,801
[45] July 20, 1976

[54] FLEXURE COMPENSATING ROLL

[75] Inventors: Anton Dolenc, Winterthur, Switzerland; Anton Herter, Friedrichshafen, Germany

[73] Assignee: Escher Wyss Limited, Zurich, Switzerland

[22] Filed: May 2, 1975

[21] Appl. No.: 574,099

[30] Foreign Application Priority Data

May 8, 1974 Switzerland.......................... 6245/74

[52] U.S. Cl. .......................................... 29/116 AD
[51] Int. Cl.² .......................................... B21B 13/02
[58] Field of Search ............. 29/115, 116 R, 116 AD

[56] References Cited
UNITED STATES PATENTS

| | | |
|---|---|---|
| 2,676,387 | 4/1954 | McArn ................................. 29/115 |
| 2,908,964 | 10/1959 | Appenzeller ................... 29/116 AD |
| 3,290,897 | 12/1966 | Kuehn ................................ 29/115 X |
| 3,419,890 | 12/1968 | Justus ................................. 29/116 R |
| 3,562,882 | 2/1971 | Widmer et al. ........................ 29/115 |
| 3,766,620 | 10/1973 | Roerig ................................. 29/115 |
| 3,785,250 | 1/1974 | Steiger ................................. 92/72 |
| 3,846,883 | 11/1974 | Biondetti ....................... 29/116 AD |
| 3,885,283 | 5/1975 | Biondetti ....................... 29/116 AD |

Primary Examiner—Alfred R. Guest
Attorney, Agent, or Firm—Pennie & Edmonds

[57] ABSTRACT

A flexure compensating roll includes a stationary core, a hollow cylindrical roll shell rotatably mounted about the core, hydraulically actuated pistons received in radial bores of the core for support of the roll shell against a mating roll, and a rotary radial piston hydraulic motor coupled between the core and roll shell for delivery of torque to the roll shell.

7 Claims, 2 Drawing Figures

FLEXURE COMPENSATING ROLL

The present invention pertains to a flexure compensating roll of the type disclosed in U.S. Pat. No. 3,846,883, which is assigned to the assignee hereof.

A roll of this type is combined with a mating roll to form a "rolling mill" or roll set, i.e. a pair of rolls between which there may be passed a web of material to operate on the thickness, the surface quality, or other properties of the web. Such flexure compensating rolls are useful in paper manufacture, for example, where a wide web of paper is to be passed between two rolls which are pressed together and where the separation of the two rolls must be uniform to close tolerances over the entire length of the rolls, in order to produce a web of uniform thickness across the width of the web.

Such a flexure compensating roll includes a rotatable annular roll shell having the shape of a hollow cylinder which is supported about a stationary core for rotation with respect to the latter. The shell is supported from the core and is pressed against the mating roll by a plurality of pistons which are received in radial bores in the core and which press against the inner surface of the shell in the plane defined by the axes of two rolls of the set. The nip at which the two rolls come together also lies in this plane. Desirably, these pistons are provided with hydrostatic lubrication, at their sliding engagement with the inside surface of the roll shell, by means of suitably throttled passages extending through the pistons from the underside thereof, where a hydraulic fluid works against the pistons. The underside of the pistons, i.e. the cylindrical cavities in the core, are connected by one or more conduits extending lengthwise of the core and connecting to a source of hydraulic fluid under pressure.

The core is supported at its ends in bearings which prevent it from rotating.

Such rolls are called flexure compensating, or alternatively flexure compensated, rolls. They are so called because they compensate for flexure of their own cores, holding the roll shell to accurately cylindrical shape at the nip, if the mating roll is heavy and stiff enough to remain cylindrical, and compensating indeed for flexure of the mating roll, so as to maintain uniform pressure at the nip, from one end of the rolls to the other.

When a roll of this type must be provided with driving torque to the shell thereof, difficulties are encountered. Chain drive as proposed in U.S. Pat. No. 2,908,964, or drive via gears, result in tangential forces which are operative on the shell and which may impair the performance of the roll through distortions imposed on the shell. If a pure rotational moment (i.e. a couple) is to be applied to the shell, there must be employed three-race bearings as shown in U.S. Pat. No. 3,290,897. This is an expensive construction and requires a drive which is in itself expensive and also bulky. The drive motor and the coupling thereof to the roll shell result in a lengthening of roll set, which is highly inconvenient in paper machines, requiring increased width for the building in which the roll set is housed. Additionally, if variable speed is to be provided, electrical equipment to effect it is costly.

It is an object of the invention to provide a flexure compensating roll free of these disadvantages which is simple and inexpensive in construction and which is compact and which may be provided with a variable speed drive.

The roll of the invention which achieves these objects employs a rotary radial piston hydraulic motor is disposed about the core for drive of the roll shell.

The applicants have found that such a motor, surrounding the core, when built for the necessary torque and operating speeds, exhibits dimensions which do not in general exceed the radial dimensions of the shell itself. In addition, the drive of the invention imposes little or no addition to the axial length of roll set beyond that of the core and shell themselves. The pump for drive of the hydraulic motor can be disposed in any convenient location either near or far from the roll set. The pump is therefore without effect on the minimum width of the machine. The drive of the invention also makes possible delivery of torque in the form of a pure rotational moment or couple, without tangential force, and it also makes possible a continuous range of speeds.

Advantageously, the hydraulic motor can be disposed between one end of the roll shell and the pier which supports the adjacent end of the core. This makes the hydraulic motor readily accessible for service, without imposing substantial changes on the form of the roll shell and the bearings therefor. When a large torque is necessary, such a motor can be provided at each end of the shell. The motor can however be disposed within the roll shell itself, for example in the middle thereof.

BRIEF DESCRIPTION OF THE DRAWING

The invention will not be further described in terms of a presently preferred exemplary embodiment thereof and with reference to the accompanying drawings in which.

DESCRIPTION OF PREFERRED EMBODIMENT

Figure 1:
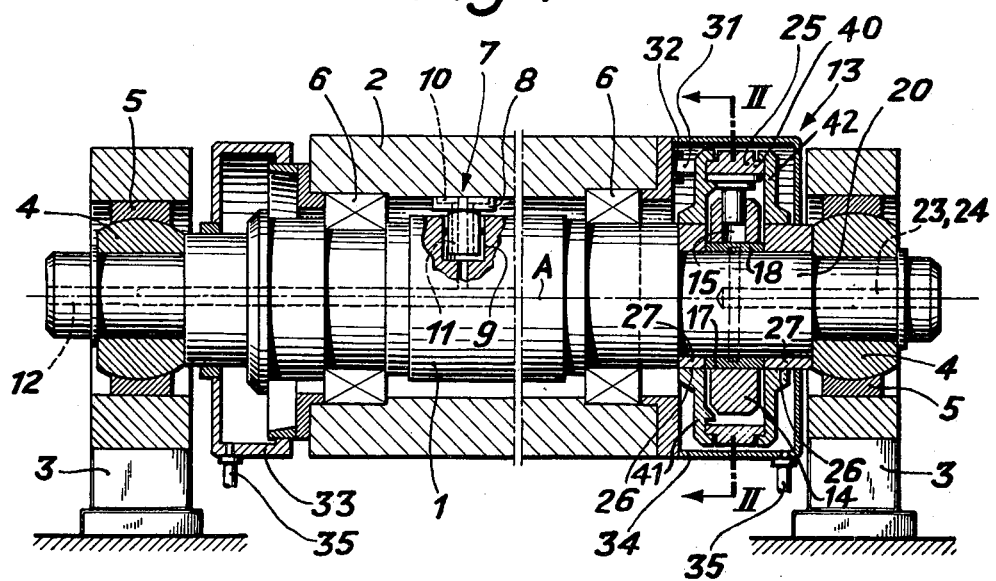
FIG. 1 is an axial section through a flexure compensating roll according to the invention, the center portion of the roll being omitted as indicated by the break lines.

The flexure compensating roll of FIG. 1 includes a core 1 surrounded by a rotatable roll shell 2. The core is supported at its ends in piers 3 with the help of spherical bearings including each a stationary sleeve 5 fixed in the pier and having a concave spherical surface, and a sleeve 4 affixed to the core and having a convex spherical surface. These bearings permit flexure of the core 1, i.e. transverse bending thereof, but include means to prevent rotation of the core about its longitudinal axis. The mating roll, which with the roll shown defines a roll set, and the mechanism which establishes and controls the stress between the mating roll and the flexure compensated roll, have been omitted from the drawing for simplicity since they may be of a known construction.

In the embodiment illustrated, the roll shell 2 is journaled at its ends on the core 1 by means of bearings 6, for example of roller or barrel type. Between the two sets of bearings 6, there is provided a plurality of roll shell supporting and flexure compensating pistons generally indicated at 7. Each of these includes a piston proper 8 which is received in a radial cylindrical bore 9 formed in the core. The pistons 7 may have hydrostatic lubrication cavities at the outer ends thereof where they bear against the inside surface of the roll shell, in the plane containing the axis of the core and the axis of the mating roll. These cavities are connected via throttling passages 11 through the pistons with the spaces in the bores 9 beneath those pistons. These spaces connect via a duct 12 lengthwise of the core to a source of hydraulic fluid under pressure not shown. A preferred construction for the shell supporting pistons is disclosed in U.S. Pat. No. 3,846,883.

At the right end of the roll as seen in FIG. 1, between the end of the shell 2 and the pier 3, there is provided a rotary radial piston hydraulic motor generally indicated at 13, and having radial pistons 16. The motor, and in particular the cylinder block 14 and the housing or power output member thereof generally indicated at 25, are of annular shape and surround the core 1. The motor 13, here shown as being of the type disclosed in U.S. Pat. No. 3,785,250, contains an annular cylinder block 14 having radial bores 15 which receive the pistons 16. The block 14 is rotatably supported on a cylindrical surface 17 of the core whose axis E (FIG. 2) is eccentric to the axis A of the roll shell as defined by the bearings 6 (and, more particularly, to the axis of the motor output member 25), as indicated by the separation of the points A and E in FIG. 2.

The cylindrical surface 17 is constituted by the outer surface of a sleeve 18 of uniform thickness which is affixed to an eccentric cylindrical portion 20 of the core 1. Grooves 21 and 22 for supply and exhaust of hydraulic drive fluid to and from the motor are formed in this sleeve. The grooves 21 and 22 are connected through radial bores and thence via axial ducts 23 and 24 in the core to a source of hydraulic fluid under pressure, not shown, these ducts leading out to the right in the core as seen in FIG. 1.

Figure 2:
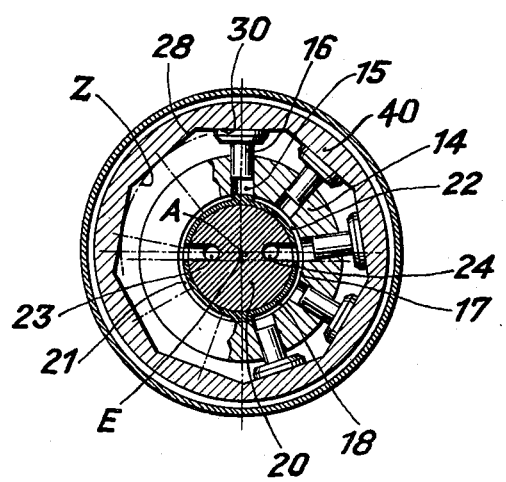
FIG. 2 is a sectional view taken on the line II—II of FIG. 1.

The output member 25 includes an outer ring 40 against the inside of which the pistons 16 bear at thrust receiving surfaces 28 on that ring 40 as indicated in FIG. 2. The member 25 additionally includes apertured disk-like members 41 and 42, affixed to the ring 40. By means of these apertured disks 41 and 42, the output member 25 of the motor is rotatably supported on two cylindrical outer bearing surfaces 26 of two rings 27 as seen in FIG. 1. The surfaces 26 are coaxial to each other, and their axis is parallel to but displaced from the axis of surface 17. The rings 27 are fixed to the core 1 on the eccentric surface 20 thereof. The bearing surfaces 26 have a common axis coincident with the axis of the roll shell 2 as defined by bearings 6 at which the roll shell is borne by the core. The rings 27 thus have eccentric inner and outer surfaces, whereby the output member 25 rotates on the coaxial surfaces 26 while the cylinder block 14 rotates on the surface 17 of the sleeve 18, the surface 17 being coaxial with the surface 20.

As appears from FIG. 2, the thrust receiving surfaces 28, one for each of pistons 16, are tangential to a common cylindrical surface indicated by the chain line Z in that figure. The surface Z is coaxial to the bearing surfaces 26 at which the output member 25 rotates with respect to the core. It is hence coaxial to the roll shell 2. The pistons 16 bear at hydrostatically lubricated surfaces 30 thereof against the surfaces 28, the surfaces 30 being perpendicular to the axes of their respective pistons.

As may be seen from FIG. 1, the output member 25 of the piston motor 13 is provided with axially extending pins 31 which engage end rings 32 fastened to the shell 2. The pins 31 and the rings 32 constitute together a coupling for the transmission of torque from the member 25 of the motor 13 to the roll shell 2. The roll shell can however be permitted to undergo limited longitudinal and radial motion with respect to the member 25, consistently with this torque transmission. These motions may be caused by flexures of the core 1 due to loading of the roll in operation. The roll can also be so constructed however as to dispense with the bearings 6, at least insofar as they define an axis of rotation for the shell with respect to the core, the shell being supported from the core exclusively at the pistons 7 so far as concerns maintenance of the desired pressure at the nip between the flexure compensating roll and the mating roll. Thus in place of the construction illustrated, the bearings 6 may have the inner races thereof supported for limited linear motion transversely of the core, in order to give to the shell freedom of translational motion in the plane defined by the axis of the core and the axis of the mating roll. Such a construction is disclosed in the application of Mario Biondetti, Ser. No. 409,644, filed Oct. 25, 1973, now U.S. Pat. No. 3,885,283 which is assigned to the assignee hereof. With such a construction for the bearings 6, as applied to the present invention, the transmission of torque from the output member 25 of the motor 13 to the shell 2 may be effected by some other suitable torque transmission device, such as one employing toothed wheels or a linkage including one or more universal joints.

Shrouds 33 and 34 in FIG. 1 serve to collect hydraulic fluid escaping to the inner surface of the roll shell at the hydrostatic bearing surfaces of the support pistons 8 and at the hydrostatically lubricated bearing surfaces shown in FIG. 2 between the pistons 16 and the output member ring 40. These shrouds are provided with return lines 35 for delivery of hydraulic fluid collected back to the pump.

It will thus be seen that the invention provides a flexure compensating roll comprising a core 1, a hollow annular shell 2 disposed about the core, hydraulically actuated pistons 8 supported in the core and bearing against the inside surface of the shell, and a rotary radial piston hydraulic motor 13 coupled between the core and shell for delivery of torque to the shell. The roll desirably further includes means such as bearings 4 and 5 to support the core at each end and to restrain the core against rotation, the motor being advantageously disposed between one end of the shell and the adjacent end of the core. Desirably further, the core includes means, such as the core portion 20 with its sleeve 18 and the rings 27, defining two parallel non-coaxial cylindrical surfaces 17 and 26, the motor including a rotary annular cylinder block 14 mounted for rotation on the surface 17 and a rotary annular output member 25 mounted for rotation on the surface 26, the motor including a plurality of pistons 16 disposed in radial bores 15 of that cylinder block, and those pistons 16 having at their outer ends thrust delivering surfaces 30 perpendicular to their axes and the output member 25 having a plurality of thrust receiving surfaces 28, one for each of the pistons 16, the thrust receiving surfaces being tangential to a cylindrical surface Z substantially coaxial to the other of those non-coaxial surfaces, namely surface 26.

In the embodiment illustrated there are two surfaces 26 coaxial to each other, but two such surfaces are not necessary. Desirably, the means which couple the motor output member 25 to the roll shell, namely the pins 31 in the example illustrated, permit relative motion of the output member and shell radially of the shell. Desirably, the hydraulically operated pistons 8 for support of the shell against the mating roll include hydrostatically lubricated bearing means, such as the cavities 10 and throttled passages 11 leading to a source of hydraulic fluid under pressure, and desirably also the pistons 16 of the hydraulic motor include hydrostatically lubricated bearing means where the thrust delivery surfaces 30 of those pistons engage the thrust receiving surfaces 28 of the motor output member 25.

While the invention has been described in terms of a presently preferred exemplary embodiment thereof, the invention itself is not limited thereto but rather comprehends all modifications of and departures from that embodiment properly falling within the scope of the claims.

We claim:

1. A flexure compensating roll comprising a core, a hollow annular shell disposed about the core, hydraulically actuated pistons supported in the core and bearing against the inside surface of the shell, and a rotary radial piston hydraulic motor coupled between the core and shell for delivery of torque to the shell.

2. A roll according to claim 1 further including means to support the core at each end and to restrain the core against rotation, wherein said motor is disposed between one end of the shell and the adjacent end of the core.

3. A roll according to claim 1 wherein the core includes means defining two parallel non-coaxial cylindrical surfaces, the motor including a rotary annular cylinder block mounted for rotation on one of said non-coaxial surfaces and a rotary annular output member mounted for rotation on the other of said non-coaxial surfaces, said motor further including a plurality of pistons disposed in radial bores of said cylinder block, said pistons having at their outer ends thrust delivering surfaces perpendicular to their axes and said output member having a plurality of thrust receiving surfaces, one for each of said pistons, said thrust receiving surfaces being tangential to a cylindrical surface substantially coaxial to the other of said non-coaxial surfaces.

4. A roll according to claim 3 wherein said one non-coaxial surface is a surface eccentric to the axis of the core and wherein said other non-coaxial surface is formed on rings affixed to the core, said rings having eccentric inner and outer surfaces.

5. A roll according to claim 3 including coupling means engaged between the motor output member and the roll shell, said coupling means permitting relative motion of the output member and shell radially of the shell.

6. A roll according to claim 1 including hydrostatically lubricated bearing means between said hydraulically actuated pistons and the inner surface of said roll shell.

7. A roll according to claim 3 including hydrostatically lubricated bearing means between the pistons of said motor and said motor output member.

* * * * *